United States Patent [19]

Wilson

[11] Patent Number: 4,802,442

[45] Date of Patent: Feb. 7, 1989

[54] CAT LITTER SCREENING DEVICE

[76] Inventor: Michael E. Wilson, 818 Hayes, Apt. C, San Francisco, Calif. 94102

[21] Appl. No.: 118,171

[22] Filed: Nov. 9, 1987

[51] Int. Cl.⁴ .......................................... A01K 29/00
[52] U.S. Cl. ..................................................... 119/1
[58] Field of Search ............................. 119/1; 294/1.3

[56] References Cited

U.S. PATENT DOCUMENTS

| | | | |
|---|---|---|---|
| 2,963,003 | 12/1960 | Oberg et al. | 119/1 |
| 2,971,493 | 2/1961 | Robb | 119/1 |
| 3,141,441 | 7/1964 | Russell | 119/1 |
| 3,476,083 | 11/1969 | Vander Wall | 119/1 |
| 3,752,120 | 8/1973 | Pallesi | 119/1 |
| 4,010,880 | 3/1977 | Guillot-Munoz | 119/1 |
| 4,014,292 | 3/1977 | Coughlin et al. | 119/1 |
| 4,047,499 | 9/1977 | Janacek | 119/1 |
| 4,615,300 | 10/1986 | McDonough | 119/1 |
| 4,616,598 | 10/1986 | Burniski et al. | 119/1 |

Primary Examiner—Paul J. Hirsch
Attorney, Agent, or Firm—Flehr, Hohbach, Test, Albritton & Herbert

[57] ABSTRACT

A cat litter screening device which includes two planar bottom panels of a mesh material with foramen sized to pass the litter but which traps substantially all fecal matter. The bottom panels are pivoted together along a central axis and lift means are attached to the sides for moving the panels up and down through the litter. The lift means include handles and side panels which are also of a mesh material. In one embodiment the handles are rigid. In another embodiment lock means is provided by which the handles can be moved to a first position down and away from the sides of the litter box and to a second position where they are locked for applying force to move the bottom panels up and down through the litter.

12 Claims, 1 Drawing Sheet

CAT LITTER SCREENING DEVICE

This invention relates in general to cat litter boxes and in particular to the screening and disposal of fecal matter from cat litter.

Households having indoor cats as pets are faced with the problem of periodically cleaning the litter in cat litter boxes. Among the devices conventionally used for this purpose are spoons, trowels and small shovels. Special devices sold in pet stores include plastic shovels or sieves formed with narrow slots which collect the fecal matter as the shovel blade is pushed through the litter. These conventional spoons, trowels, shovels and other devices have a number of disadvantages and drawbacks. Thus, many pet owners, especially the elderly, find it difficult to use the spoons, trowels and shovels to pick up fecal matter from the litter box. The soiled spoons, trowels and shovels are also unsightly when stored near the litter box. Oftentimes the use of these conventional devices results in some of the fecal matter being inadvertently left in the litter. This problem in turn increases the risk of infection from toxoplasmosis to pregnant women, a disease which is known to be prevalent where cat fecal matter is not properly disposed of.

It is therefore an object of the present invention to provide a new and improved cat litter screening device which obviates many of the disadvantages and drawbacks of present screening devices.

Another object is to provide a screening device of the type described which is embedded in situ beneath the surface of the litter in the box for use by the cat and in which the fecal matter is collected and disposed of by lifting the device clear of the litter.

Another object is to provide a cat litter screening device of the type described which is more easy to use than conventional devices, which does not present an unsightly appearance when in use, which is reusable, which stirs up the gravel more completely for more effective urine absorption and which more completely cleans the litter of fecal matter to thereby minimize the risk of infection from diseases such as toxoplasmosis.

The invention in summary comprises at least two planar bottom panels having screen-like foramen which are of a size permitting passage of litter while occluding passage of a substantial portion of the fecal matter. The bottom panels are hinged together along a central axis and lift means are attached to the sides of each panel. For cleaning the litter box the pet owner pulls up on the lift means which causes the panels to move up through the litter while folding together to trap fecal matter which is then carried by the device for disposal in a trash can or other suitable receptable.

The foregoing and additional objects and features of the invention will appear from the following specification in which the several embodiments have been set forth in conjunction with the accompanying drawings.

Figure 1:
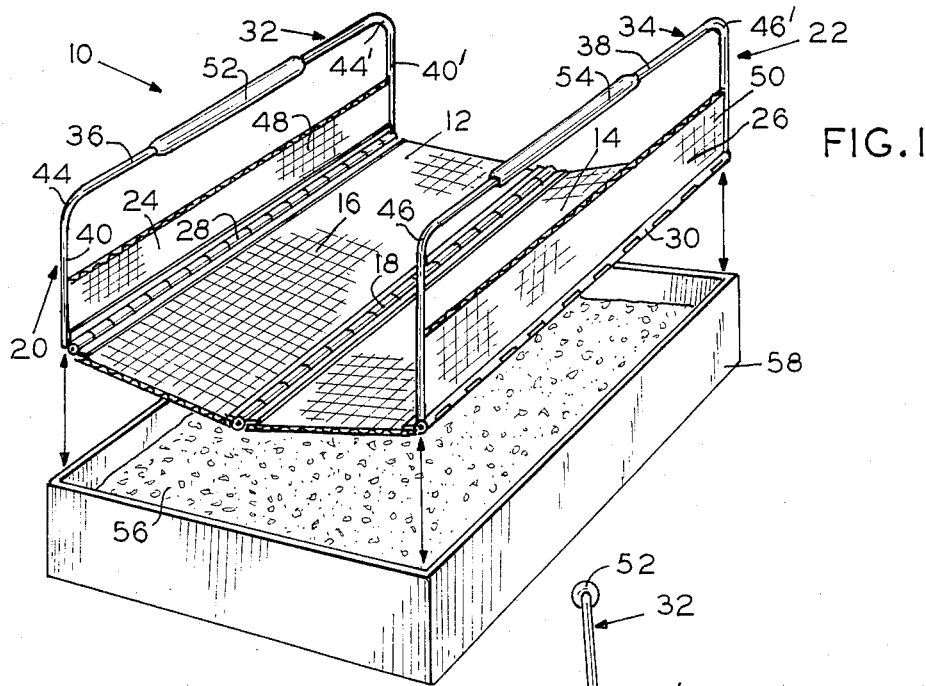
FIG. 1 is a perspective view of the screening device incorporating one embodiment of the invention shown disposed above a cat litter box.
Figure 2:
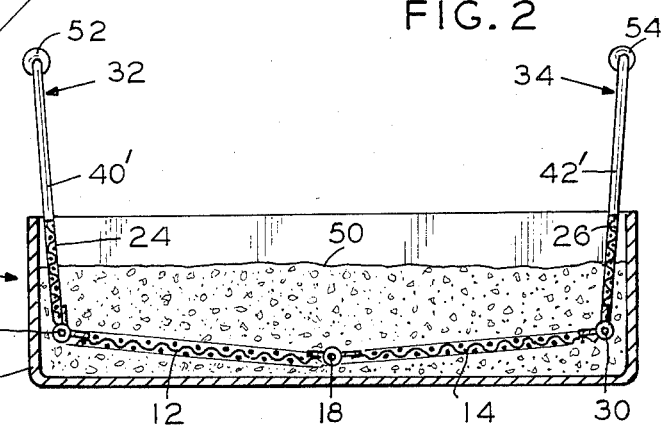
FIG. 2 is a lateral cross-section view of the screening device of FIG. 1 shown embedded in the litter of the box.
Figure 3:
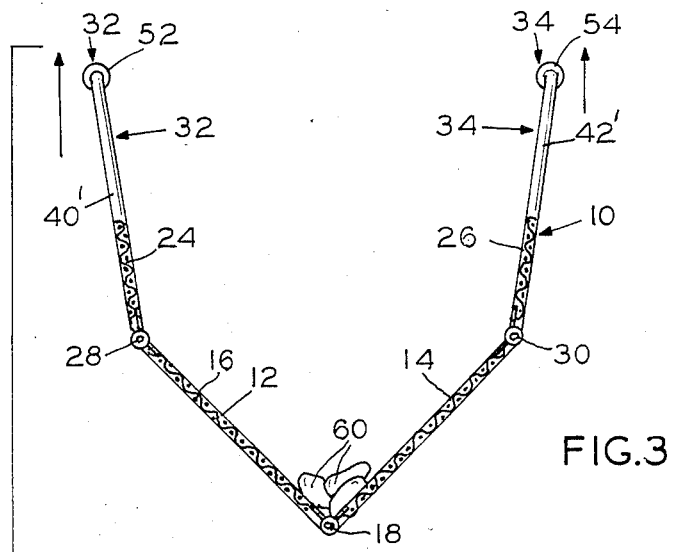
FIG. 3 is a cross-section view similar to FIG. 2 showing the device at a position lifted above the litter.

In the drawings FIGS. 1-3 illustrate generally at 10 a cat litter screening device according to one preferred embodiment of the invention for use with a litter box 58 of the type typically employed in households having indoor cats as pets. Device 10 is comprised of at least two planar bottom panels 12, 14 which are of generally rectangular configuration. Each of the panels has a large plurality of foramen 16 of a square, circular or oval shape and with a mean diameter of a size which permits the cat litter to pass through the foramen while occluding passage of a substantial portion of the fecal matter. Preferably the mean diameter of the foramen is on the order of $\frac{1}{8}$". The bottom panels advantageously can be formed of a metal screen or other mesh material in which reticulated cross wires form rectangular or square foramen, as illustrated in the preferred embodiment shown in FIG. 1. The bottom panels are connected together for pivotal movement about a central axis by suitable hinge means 18. A piano wire-type hinge or other suitable pivot connection can be employed for hinge means 18.

At the sides of each bottom panel remote from the central axis lift means 20, 22 are provided for use in manually pressing the bottom panels down into the litter and for lifting the panels outwardly and away from the box. Each lift means comprises planar side panels 24, 26 which are pivotally connected to the side edges of the bottom panels by a suitable pivot connection 28, 30 which can be piano wire-type hinges. Each of the lift means further includes handles 32, 34 which are attached to and extend distally from the side panels. Each handle comprises an elongate grip portion 36, 38 which extends between and is joined integrally with support rods 40, 40', and 42, 42' through bight portions 44 and 46. The proximal ends of the support rods form the sides of panels 24 and 26. Each side panel is formed with a plurality of screen-like foramen 48, 50 of a mean diameter size comparable to the size of bottom panel foramen 16.

Grip coverings 52, 54 are mounted along the midspan of each of the handles for the pet owner to grasp while using the device. Preferably the grip coverings are formed of a suitable smooth, hard surface plastics material which is sanitary and resists soiling.

In the operation and use of screening device 10 the first step is to embed the device down beneath the surface of the litter 56 in the box 58. To accomplish this the pet owner grasps and separates the two handles 32, 35 to spread the bottom panels 12 and 14 open into a generally flat configuration as illustrated in FIG. 1. Holding the device over the box the bottom panels are forced down through the litter by pressing down on the handles until the panels move closely adjacent to the inside bottom of the box at the position shown in FIG. 2. After the box is used by the cat the pet owner pulls upwardly on the handles to move the panels up through the litter and away from the box. Fecal matter 60 in the litter is trapped by the foramen and carried upwardly with the panels. During the same upward motion the handles can be moved toward each other permitting the bottom panels to fold together for constraining the trapped fecal matter in the manner shown in FIG. 3. The device is then carried to the trash can or other suitable receptable where the handles are tipped toward one end so that the bottom panels form a trough for pouring the fecal matter into the receptacle. The screening device is then taken back to the litter box and re-embedded down into the litter for the next cycle of use.

Figure 4:
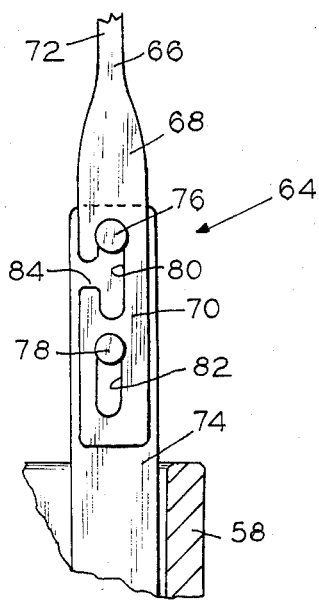
FIG. 4 is a partial elevational view to an enlarged scale of another embodiment providing a lockable lift means showing the handle locked in the upright position.
Figure 5:
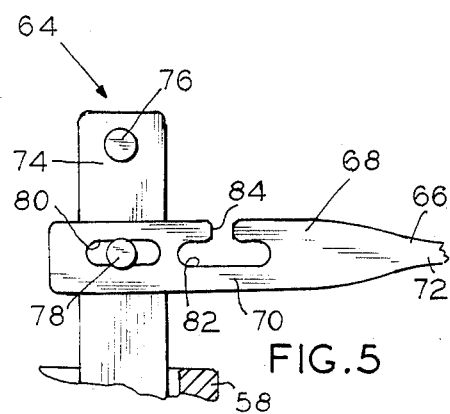
FIG. 5 is a view similar to FIG. 4 showing the handle unlocked and pivoted to its lower position.

FIGS. 4 and 5 illustrate another embodiment of the invention which incorporates two-position lockable lift means 64. In this embodiment the bottom and side panels can be constructed in accordance with the embodiment of FIG. 1 with lockable lift means on each side panel. The two lift means are of mirror-image construction and it will suffice to describe the lift means 64 on only one of the sides. The lockable lift means is comprised of a handle 66 having an elongate grip portion, not shown, similar to the grip portion of the embodiment of FIG. 1, and which extends between and is carried by a pair of support rods, one of which is shown at 68 in FIGS. 4 and 5. The lower end of support rod 68 terminates in an enlarged portion 70 which projects at an acute angle with respect to the upper portion 72 of the rod. The distal end of a rod 74 which extends upwardly from the side panel is positioned adjacent the enlarged portion 70 at the respective end of the handle. A pair of rivets 76, 78 having enlarged heads are mounted in vertically spaced positions and extend horizontally outwardly from one side of each rod 74. Axially aligned slots 80, 82 are formed in enlarged portion 70 with the lower slot 82 sized to slidably fit about the shank of lower river 78. Upper slot 80 is of a longer length and is sized to slidably fit about the shank of the upper rivet 76. At the mid-portion of the upper slot a side opening 84 is formed of a size which permits through movement of the shank of the upper rivet.

In the operation of the lockable lift means 64 handle 66 is moved to the second or locked position as shown in FIG. 4 when it is desired to either move the screening device down into or lift it from the litter. In the locked position lower rivet 78 is located at the upper end of slot 82 while upper rivet 76 is at the upper end of slot 80 thereby preventing the handle from pivoting in either direction. In this locked position a downward force on the handle carries through the lift means and transfers to rod ends 74 for forcing the bottom panels down through the litter. When the bottom panels reach the desired positions below the litter the handles are pulled upwardly a short distance until side openings 84 are aligned with the upper rivets. The handles are then pivoted outwardly about the lower rivets with the shanks of the upper rivets clearing the opening to unlock the handles. The handles continue to pivot downwardly to the unlocked first position lying over the upper edge of litter box 58 as shown in FIG. 5. The handles thereby lie at positions clear of the box to permit free access by the animal. The handles can easily be relocked for screening the litter by pivoting both handles upwardly to positions where the upper rivets are again within the upper slots. Upward force is then applied to the handles which are moved upwardly to positions where the upper and lower rivets are disposed adjacent the lower ends of the respective slots. In this position the handles are locked rigid against pivotal movement permitting continued upward force to move the bottom panels up and clear from the litter.

The operation of the cat litter screening device of the present embodiments permits the cat owner to screen the litter faster than by shoveling with a trowel or other hand-operated sieve. This is because the fecal matter can be screened and removed from the litter by the single step of merely pulling the handles upwardly from the box and then pouring the trapped fecal matter into the receptable. The device can then be rapidly embedded in the litter box by using the handles to push the panels down through the litter in one motion. Both steps of removal and replacement of the device also function to stir up the litter to promote more effective urine absorption. The screening device of the invention is reusable and can be easily cleaned by periodically spraying with water from a hose. The device of the invention also does not present an unsightly appearance when in use because all portions except the handles are concealed by the litter. Because the size of the combined bottom panels is commensurate with the size of the litter box substantially all of the fecal matter is screened out by one removal step. The result is that the litter stays fresher for a longer period of time, which is more economical for the pet owner. Because the present invention makes it possible to keep the litter box cleaner another important result is that the risk of toxoplasmosis infection is minimized, which in turn means that the invention is relatively safer for those especially susceptible to the infection such as pregnant women.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A device for removing fecal matter from cat litter contained in a litter box, comprising the combination of at least two planar bottom panels, each panel having a pair of spaced-apart side edges and a pair of spaced-apart end edges which extend orthogonal to said side edges to form a generally rectangular configuration, means forming a plurality of screen-like foramen in each panel, said foramen being sized to permit passage therethrough of the litter while occluding passage of a substantial portion of the fecal matter, said bottom panels being positioned in side-by-side relationship with a side edge of one bottom panel being adjacent to a side edge of the other bottom panel, hinge means for connecting said adjacent side edges of the panels together for pivotal movement about a central axis, lift means attached to each panel at the side edges thereof remote from the central axis for moving the panels down through the litter toward the bottom of the box, for lifting the panels up through the litter and away from the box while carrying fecal matter trapped by the foramen and for disposing of fecal matter carried by the panels, said end edges being coextensive with the plane of their respective bottom panel whereby when the device is tipped to move either of the end edges downwardly the discharge of fecal matter from the bottom panels over the end edges is unrestricted.

2. A device as in claim 1 in which the lift means includes planar side panels and means forming a plurality of screen-like foramen in each side panel, said foramen of the side panels being sized to permit passage therethrough of the litter while occluding passage of a substantial portion of the fecal matter.

3. A device as in claim 2 in which the lift means includes handles attached to and extending distally from respective side panels.

4. A device as in claim 3 in which each handle comprises an elongate grip portion extending between a pair of support rods, said support rods extending outwardly from respective ends of the side panels.

5. A device as in claim 4 in which each support rod includes pivot means for selectively pivoting the distal end of the grip portion to a first position down and away from the respective side panel when the device is disposed within the litter box and to a second position in which the distal end of the grip portion is above the respective side panel for moving the device toward and away from the box.

6. A device as in claim 5 in which said pivot means includes means for locking each grip portion relative to a respective side panel in the second position.

7. A device as in claim 1 which includes pivot means for connecting each lift means to the outer edge of a respective bottom panel for pivotal movement about axes parallel to the central axis.

8. A device as in claim 7 in which said lift means includes planar side panels and means forming a plurality of screen-like foramen in each side panel, said foramen of the side panels being sized to permit passage therethrough of the litter while occluding passage of a substantial portion of the fecal matter.

9. A device as in claim 8 in which said lift means includes handles attached to and extending distally from respective side panels.

10. A device as in claim 9 in which each handle comprises an elongate grip portion extending between a pair of support rods, said support rods extending outwardly from respective ends of the side panels.

11. A device as in claim 10 in which said pivot means selectively pivots the distal end of the grip portion to a first position down and away from the respective side panel when the device is disposed within the litter box and to a second position in which the distal end of the grip portion is above the respective side panel for moving the device toward and away from the box.

12. A device as in claim 11 in which said pivot means includes means for locking each grip portion relative to a respective side panel in the second position.

* * * * *